UNITED STATES PATENT OFFICE 2,539,207

PLASTICIZED VINYL HALIDE RESINS

Moyer M. Safford, Schenectady, N. Y., assignor to General Electric Company, a corporation of New York No Drawing. Application September 1, 1948, Serial No. 47,340

9 Claims. (Cl. 260—30.6)

This invention relates to new and useful compositions of matters comprising plasticized polyvinyl halides. More particularly, the invention is concerned with compositions comprising polyvinyl halides, e. g., polyvinyl chloride, etc., having incorporated therein a plasticizer comprising essentially a mixture of polymerizable materials comprising an unsaturated alkyd resin and an unsaturated alcohol polyester of an aromatic polycarboxylic acid and another plasticizer (such as tricresyl phosphate) which, for convenience, I shall refer to as a "non-polymerizable plasticizer" hereafter and in the appended claims.

It has been known heretofore that artificial masses or synthetic rubber-like compositions may be made from vinyl halide polymers by plasticizing such polymeric material with organic compounds. A plasticizer commonly used for softening such polymers is tricresyl phosphate. When tricresyl phosphate alone is used as a plasticizer in such a polymeric material, it has the physical characteristic of readily flowing under pressure and losing strength at elevated temperatures.

I have discovered that when polyvinyl chloride is plasticized with a mixture of polymerizable materials, in addition to the non-polymerizable plasticizers, I am able to obtain a composition which has relatively good tensile strength, and greatly reduced flow at elevated temperatures as high as 150° C. and, in addition, the plasticizer loss is reduced. This reduced flow is important in the electrical conductor art because it reduces the tendency of the insulation to flow away from the conductor and ultimately to cause a short circuit.

The polymerizable plasticizer (hereafter so designated in the specification and claims) that I have found desirable in plasticizing polyvinyl chloride comprises a mixture of (1) a reactive polyester resin, prepared by the interaction of an alpha unsaturated, alpha, beta polycarboxylic acid and a polyhydric alcohol, and (2) an unsaturated alcohol polyester of an aromatic polycarboxylic acid wherein the alcohol residues of the said esters are preferably the same and correspond to the general formula

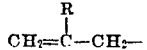

where R is a member selected from the class consisting of hydrogen, a halogen, an alkyl radical (e. g., methyl, ethyl, propyl, butyl, hexyl, dodecyl, etc.), and an aryl radical (e. g., phenyl, tolyl, xylyl, benzyl, etc.).

The allyl compounds which have been found to be the most suitable for my purposes are those having a high boiling point, such as the diallyl esters, e. g., diallyl phthalate. These esters are prepared by the interaction of an unsaturated alcohol, such as allyl, methallyl, 2-chlorallyl, 2-phenyl allyl, etc., alcohols and an aromatic polycarboxylic acid or anhydride, such as tetrachlorophthalic, 4-chlorophthalic, phthalic, benzoyl phthalic, terephthalic, isophthalic, benzophenone-2,4 dicarboxylic, naphthalic, etc., acids or anhydrides.

The unsaturated alkyd resins are prepared from alpha unsaturated alpha, beta polycarboxylic acids but do not include acids wherein the unsaturated group is part of an aromatic acting radical. Examples of these acids are maleic, monohalomaleic, fumaric, monohalofumaric, citraconic, mesaconic, acetylene dicarboxylic, aconitic, itaconic and its homologues, etc. Any polyhydric alcohol containing at least two esterifiable aliphatic hydroxyl groups may be used in preparing the unsaturated alkyd resins. Examples of such polyhydric alcohols are ethylene glycol, di-, tri- and tetra-ethylene glycols, propylene glycol, trimethylene glycol, thiodiglycol, glycerine, pentaerythritol, etc.

My invention may best be illustrated by the use of a mixture of polymerizable materials comprising diethylene glycol maleate and diallyl phthalate, together with tricresyl phosphate as the non-polymerizable plasticizer. It is to be understood that I may use other non-polymerizable plasticizers in place of tricresyl phosphate, which are compatible with the polyvir halide, e. g., polyvinyl chloride. Examples are dibutyl sebacate, dibenzyl sebacate, dioctyl phthalate, dibutyl phthalate, dioctyl sebacate, isophorone, etc.

In compounding my claimed plasticized polyvinyl halide composition, I may use varying amounts of polymerizable and non-polymerizable plasticizers. I have found that the following range of proportions of ingredients gives good results wherein all parts are by weight:

| | Parts |
|---|---|
| Polyvinyl halide | 100 |
| Non-polymerizable plasticizer | 33⅓ to 125 |
| Polymerizable plasticizer | 5 to 33⅓ |

The proportion of unsaturated alkyd resin in the polymerizable plasticizer may be varied within wide limits, but preferably comprises from 25 to 75 per cent, by weight, of the total weight of the polymerizable plasticizer.

Optimum ranges appear to be from 50 to 75 parts of the non-polymerizable plasticizer and from 7 to 20 parts of the polymerizable plasticizer for each 100 parts of the polyvinyl halide, the proportion of unsaturated alkyd resin in the polymerizable plasticizer being essentially the same as that disclosed above.

Although curing of the polymerizable plasticizer may be effected by heat alone, however, in order to accelerate the curing of the polymerizable plasticizer, I prefer to incorporate a vinyl polymerization catalyst. This catalyst may be present in amounts ranging from about 1 to 5 per cent, by weight, based on the total weight of the polymerizable plasticizer. It is, of course, apparent that smaller or larger amounts of the catalyst may be employed depending upon the speed of polymerization desired. Amounts below 1 per cent require longer periods of time, usually at higher temperatures, for effecting a cure of the polymerizable plasticizer, while amounts greatly in excess of five per cent will speed up markedly the conversion of the polymerizable plasticizer to an essentially thermoset stage.

Although I have found that benzoyl peroxide is a suitable catalyst, I may nevertheless use other vinyl polymerization catalysts, as, for instance, tertiary butyl perbenzoate, ditertiary butyl perphthalate, acetyl peroxide, lauryl peroxide, stearyl peroxide, ozone, ozonides, barium peroxide, sodium peroxide, perborates, persulfates, perchlorates, etc.

In preparing the claimed compositions, the vinyl halide resin, the polymerizable plasticizer and the non-polymerizable plasticizer and catalyst (if any) are milled together on conventional rubber compounding rolls which are preferably maintained at around 120 to 135° C. Short periods of milling and processing are desirable in order to prevent too rapid curing of the polymerizable plasticizer. After being thoroughly mixed, the composition is then cured in a mold to the desired configuration under pressure for about 15 to 45 minutes at around 125 to 165° C. The time and temperature ranges may vary depending upon the special application intended for the composition, which may vary in thickness. For example, I may cure the mixture for times ranging from 20 to 80 minutes at higher or lower temperatures than those disclosed above, for instance, from 150 to 175° C.

It is within the scope of this invention that it may be desirable that no preliminary heat treatment of the milled material be used and that the plasticized composition be used for its ultimate purpose, e. g., in injection molding, in that form. The further curing of the plasticized composition may occur either in the molding operation (i. e., during injection molding) or else during use of the composition in the particular desired application. After forming, the molded object may be further heat treated if desired.

In order that those skilled in the art may better understand how the present invention may be practiced, the following examples are given by way of illustration and not by way of limitation. All parts are by weight. In each of the following examples, the procedure for preparing the compositions of matter described therein are essentially the same. More particularly, all the ingredients were milled together on regular rubber compounding rolls until a homogeneous sheet was obtained. The sheet was then removed from the rolls and each composition was cured in a mold at about 500 p. s. i. for 30 minutes at 150° C. In each case a tough, flexible, transparent, resilient material was obtained. For comparison, the effect of using either an unsaturated alkyd resin, more specifically, diethylene glycol maleate or diallyl phthalate are included in the following results.

Example 1

|   | Parts |
|---|---|
| Polyvinyl chloride | 60.0 |
| Diethylene glycol maleate | 4.8 |
| Diallyl phthalate | 4.8 |
| Tricresyl phosphate | 30.0 |
| Benzoyl peroxide | 0.4 |

Example 2

|   | Parts |
|---|---|
| Polyvinyl chloride | 60.0 |
| Tricresyl phosphate | 40.0 |

Example 3

|   | Parts |
|---|---|
| Polyvinyl chloride | 60.0 |
| Tricresyl phosphate | 30.0 |
| Diallyl phthalate | 9.6 |
| Benzoyl peroxide | 0.4 |

Example 4

|   | Parts |
|---|---|
| Polyvinyl chloride | 60.0 |
| Tricresyl phosphate | 35.0 |
| Diallyl phthalate | 4.8 |
| Benzoyl peroxide | 0.2 |

Example 5

|   | Parts |
|---|---|
| Polyvinyl chloride | 60.0 |
| Tricresyl phosphate | 30.0 |
| Diethylene glycol maleate | 9.6 |
| Benzoyl peroxide | 0.4 |

Samples of each of the molded sheets were tested for tensile strengths at 30° C. and 80° C. In addition, the per cent flow of the samples at 150° C. under 15 pounds pressure/sq. in. was also determined. The following are the results of these tests:

| Example | Tensile Strength, Lbs./Sq. In. | | Per Cent Flow at 150° C. |
|---|---|---|---|
|  | 30° C. | 80° C. |  |
| 1 | 3,200 | 900 | 12 |
| 2 | 2,600 | 480 | 27.5 |
| 3 | 2,600 | 600 | 24 |
| 4 | 2,500 | 400 | 23 |
| 5 | 2,600 | 600 | 25 |

Example 6

In this example, tests were conducted on two compositions which were obtained by milling on differential compounding rolls the following two sets of ingredients, Sample B being employed as a control:

| Sample A | Parts | Sample B | Parts |
|---|---|---|---|
| Polyvinyl chloride | 60 | Polyvinyl chloride | 60 |
| Tricresyl phosphate | 20 | Tricresyl phosphate | 20 |
| Diallyl phthalate | 9.6 | Diallyl phthalate | 19.2 |
| Diethylene glycol maleate | 9.6 | Benzoyl peroxide | 0.8 |
| Benzoyl peroxide | 0.8 | | |

The compounded sheets were removed from the roll and samples of each sheet were cured in a heated mold at about 500 p. s. i. for lengths of time varying from 20 to 80 minutes at 150° C. to yield in each case a flexible, tough, transparent, resilient material. Each sample was then tested for tensile strength at 30° and 80° C., and per cent flow at 150° C., using the same conditions for determining this latter property as employed in the preceding five examples. The following tables show the results of these tests.

*Sample A*

| Minutes Cured at 150° C. | Tensile Strength at 30° C. | Tensile Strength at 80° C. | Per Cent Flow at 150° C. |
|---|---|---|---|
| | P. s. i. | P. s. i. | |
| 20 | 2,900 | 1,090 | 7.85 |
| 30 | 3,200 | 1,150 | 6.25 |
| 40 | 3,600 | 1,300 | 6.12 |
| 80 | 3,900 | 1,450 | 6.00 |

*Sample B*

| Minutes Cured at 150° C. | Tensile Strength at 30° C. | Tensile Strength at 80° C. | Per Cent Flow at 150° C. |
|---|---|---|---|
| | P. s. i. | P. s. i. | |
| 20 | 2,900 | 1,000 | 21. |
| 30 | 2,945 | 983 | 26. |
| 40 | 2,825 | 1,009 | 21. |
| 80 | 2,977 | 1,070 | 19. |

In addition to the polyvinyl chloride employed in the foregoing examples, it will be apparent to those skilled in the art that my invention is also applicable to other vinyl halide resins, for example, polyvinyl bromide and polyvinyl iodide. Compositions comprising polyvinyl iodide should be avoided where resistance to discoloration at elevated temperatures is important. Polyvinylidene halides, for instance, polyvinylidene chloride, polyvinylidene bromide, etc., may also be modified in accordance with the teachings and disclosures described previously.

Other vinyl halide resins, such as copolymers of a vinyl halide and a copolymerizable composition, for example, vinyl alcohol esters of monocarboxylic saturated aliphatic acids, for instance, vinyl acetate, vinyl propionate, vinyl butyrate, etc., may also be employed wherein the vinyl halide comprises a major portion of the polymerizable mass, for example, from 50 to 95 per cent of the total weight of the vinyl halide and the vinyl ester.

The synthetic compositions of this invention are especially adapted for use as electrical insulation in producing insulated electrical conductors and cables. The usual modifying agents generally used with vinyl halide resins may be employed, for example, fillers, pigments, dyes, opacifiers, mold lubricants, color stabilizers, etc.

While I have herein disclosed specific embodiments of my invention, I do not intend to limit the invention solely thereto for it is obvious that many modifications, including substituting equivalent materials and varying the proportions of materials used, are within the spirit and scope of the invention as defined in the appended claims.

What I claim as new and desire to secure by Letters Patent of the United States is:

1. A composition comprising, by weight, (1) 100 parts of a vinyl halide resin, (2) from 5 to 33⅓ parts of a polymerizable plasticizer comprising a mixture of polymerizable ingredients containing (a) an esterification product of an alpha unsaturated, alpha, beta polycarboxylic acid and a polyhydric alcohol and (b) a polyallyl ester of an aromatic polycarboxylic acid wherein the allyl residue of the said ester corresponds to the general formula

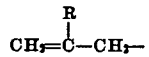

where R is a member selected from the class consisting of hydrogen, a halogen, an alkyl radical and an aryl radical, the esterification product comprising from 25 to 75% by weight of the total weight of the total weight of (a) and (b), and (3) from 33⅓ to 125 parts of a non-polymerizable plasticizer.

2. A composition comprising, by weight, (1) 100 parts polyvinyl chloride, (2) from 5 to 33⅓ parts of a polymerizable plasticizer comprising a mixture of polymerizable ingredients containing (a) an esterification product of an alpha unsaturated, alpha, beta polycarboxylic acid and a polyhydric alcohol and (b) a polyallyl ester of an aromatic polycarboxylic acid wherein the allyl residue of the said ester corresponds to the general formula

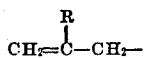

where R is a member selected from the class consisting of hydrogen, a halogen, an alkyl radical and an aryl radical, the esterification product comprising from 25 to 75% by weight of the total weight of (a) and (b), and (3) from 33⅓ to 125 parts of a non-polymerizable plasticizer.

3. A composition comprising, by weight, (1) 100 parts polyvinyl chloride, (2) from 5 to 33⅓ parts of a mixture of (a) diethylene glycol maleate and (b) diallyl phthalate, the diethylene glycol maleate comprising from 25 to 75% by weight of the total weight of (a) and (b), and (3) from 33⅓ to 125 parts of a nonpolymerizable plasticizer.

4. A composition comprising, by weight, (1) 100 parts of a vinyl halide resin, (2) from 5 to 33⅓ parts of a polymerizable plasticizer comprising a mixture of polymerizable ingredients containing (a) an esterification product of an alpha unsaturated, alpha, beta polycarboxylic acid and a polyhydric alcohol and (b) a polyallyl ester of an aromatic polycarboxylic acid wherein the allyl residue of the said ester corresponds to the general formula

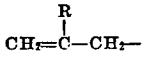

where R is a member selected from the class consisting of hydrogen, a halogen, an alkyl radical and an aryl radical, the esterification product comprising from 25 to 75% by weight of the total weight of (a) and (b), and (3) from 33⅓ to 125 parts tricresyl phosphate.

5. A composition comprising, by weight, (1) 100 parts of a vinyl halide resin, (2) from 5 to 33⅓ parts of a polymerizable plasticizer comprising a mixture of polymerizable ingredients containing (a) an esterification product of an alpha unsaturated, alpha, beta polycarboxylic acid and a polyhydric alcohol and (b) a polyallyl ester of an aromatic polycarboxylic acid wherein the allyl residue of the said ester corresponds to the general formula

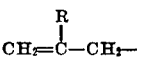

where R is a member selected from the class consisting of hydrogen, a halogen, an alkyl radical and an aryl radical, the esterification product comprising from 25 to 75% by weight of the total weight of (a) and (b), (3) from 33⅓ to 125 parts of a non-polymerizable plasticizer, and (4) from 1 to 5 per cent, by weight, based on the weight of (2) of a vinyl polymerization catalyst.

6. A composition comprising, by weight, (1) 100 parts polyvinyl chloride, (2) from 5 to 33⅓ parts of a polymerizable plasticizer comprising a mixture of polymerizable ingredients comprising (a) diethylene glycol maleate and (b) diallyl phthalate, the diethylene glycol maleate comprising from 25 to 75% by weight of the total weight of (a) and (b), (3) from 33⅓ to 125 parts of a non-polymerizable plasticizer, and (4) a vinyl polymerization catalyst for (2).

7. A composition as in claim 6 wherein the non-polymerizable plasticizer is tricresyl phosphate.

8. A composition of matter comprising, by weight, (1) 100 parts polyvinyl chloride, (2) from 7 to 20 parts of a polymerizable plasticizer comprising a mixture of ingredients containing (a) diethylene glycol maleate and (b) diallyl phthalate, the diethylene glycol maleate comprising from 25 to 75% by weight of the total weight of (a) and (b), (3) from 50 to 75 parts of a non-polymerizable plasticizer for (1), and (4) a polymerization catalyst for (2) comprising benzoyl peroxide.

9. A composition of matter comprising, by weight, (1) 100 parts polyvinyl chloride, (2) from 7 to 20 parts of a polymerizable plasticizer comprising (a) diethylene glycol maleate and (b) diallyl phthalate, the diethylene glycol maleate comprising from 25 to 75 per cent, by weight, of the total weight of (a) and (b), (3) from 50 to 75 parts tricresyl phosphate, and (4) from 1 to 5 per cent, by weight, benzoyl peroxide based on the weight of (2).

MOYER M. SAFFORD.

REFERENCES CITED

The following references are of record in the file of this patent:

UNITED STATES PATENTS

| Number | Name | Date |
|---|---|---|
| 2,155,590 | Garvey | Apr. 25, 1939 |

OTHER REFERENCES

Ind. and Eng. Chem., article by Garvey et al., vol. 33, No. 8, August 1941, pages 1060–1062.